United States Patent [19]

Snow

[11] Patent Number: 5,058,376
[45] Date of Patent: Oct. 22, 1991

[54] TURBOFAN SYNCHROPHASER

[75] Inventor: Barton H. Snow, Wyoming, Ohio

[73] Assignee: General Electric Company, Cincinnati, Ohio

[21] Appl. No.: 274,511

[22] Filed: Nov. 21, 1988

[51] Int. Cl.[5] .............................. F02K 3/04; F02C 6/00
[52] U.S. Cl. ...................................... 60/204; 60/226.1; 60/39.15
[58] Field of Search .................. 60/39.02, 224, 226.1, 60/39.281, 39.15, 39.161, 204; 416/34; 364/431.02

[56] References Cited

U.S. PATENT DOCUMENTS

| | | | |
|---|---|---|---|
| 2,887,621 | 5/1959 | Wilde, Jr. | 416/34 |
| 3,186,165 | 6/1965 | Edkins | 60/224 |
| 3,365,882 | 1/1968 | Greune | 60/224 |
| 3,368,346 | 2/1968 | Warne | 60/224 |
| 3,589,832 | 6/1971 | Harris | 416/34 |
| 3,689,175 | 9/1972 | Hartzell et al. | 416/34 |
| 3,811,273 | 5/1974 | Martin | 60/224 |
| 4,100,731 | 7/1978 | Janes et al. | 60/39.15 |
| 4,245,955 | 1/1981 | Lambertson | 416/34 |
| 4,653,981 | 3/1987 | Harner et al. | 416/34 |
| 4,659,283 | 4/1987 | Niessen et al. | 416/34 |

Primary Examiner—Louis J. Casaregola
Attorney, Agent, or Firm—Jerome C. Squillaro; Bernard E. Shay

[57] ABSTRACT

An improved synchrophasing system for synchrophasing fan spools and engine core spools of one or more "slave" turbofan engines to a "master" engine is disclosed. A fuel control means is provided for modulating the flow of fuel to the slave engines to first synchrophase the operation of the engine fan spools. A variable stator vane control means is provided for then modulating the position of variable stator vanes within the slave engines to synchrophase the operation of the engine core spools.

2 Claims, 3 Drawing Sheets

TURBOFAN SYNCHROPHASER

The present invention relates to aircraft engine synchrophasing systems and is particularly applicable to twin-spool turbofan, turboprop, or prop-fan engines.

BACKGROUND OF THE INVENTION

A small mismatch in engine speeds on a multi-engined propeller aircraft can cause undesirable acoustic noise and vibrations corresponding to the difference in engine speeds. One method of controlling noise and vibration—synchrophasing—involves comparing the rotational speeds and phase relationships of the aircraft engines. The synchrophasing system, using one engine as a master engine, adjusts the engine speeds of the remaining "slave" engines to be equal to the speed of the master engine. The engine speeds of the slave engines are further trimmed so that any given blade or propeller of a slave engine is in a fixed phase relationship relative to a corresponding blade or propeller of the master engine.

In the case of multi-spool engines, such as turbofan, turboprop or prop-fan engines, only one spool is synchrophased. The spool that is synchrophased is normally the fan spool on a turbofan engine or the prop spool on a turboprop or prop-fan engine. However, undesirable noise or vibration may still be produced by the non-synchrophased spools.

OBJECTS OF THE INVENTION

It is an object of the present invention to provide a new and improved method and means for reducing cabin noise in an aircraft having two or more multi-spool engines.

It is an additional object of the present invention to provide a new and improved method and means for synchrophasing two or more multi-spool aircraft engines.

SUMMARY OF THE INVENTION

The present invention applies to an aircraft having two or more multi-spool engines. In one form of the invention, applicable to twin-spool turbofan engines wherein each engine includes a fan spool and a core spool, a fuel control means is provided for modulating the fuel flow to the engines to synchronize the operation of the engine fan spools. A variable stator vane control means is also provided for modulating the position of variable stator vanes within the engines to concurrently synchronize the operation of the engine core spools.

DETAILED DESCRIPTION OF THE INVENTION

Figure 1:
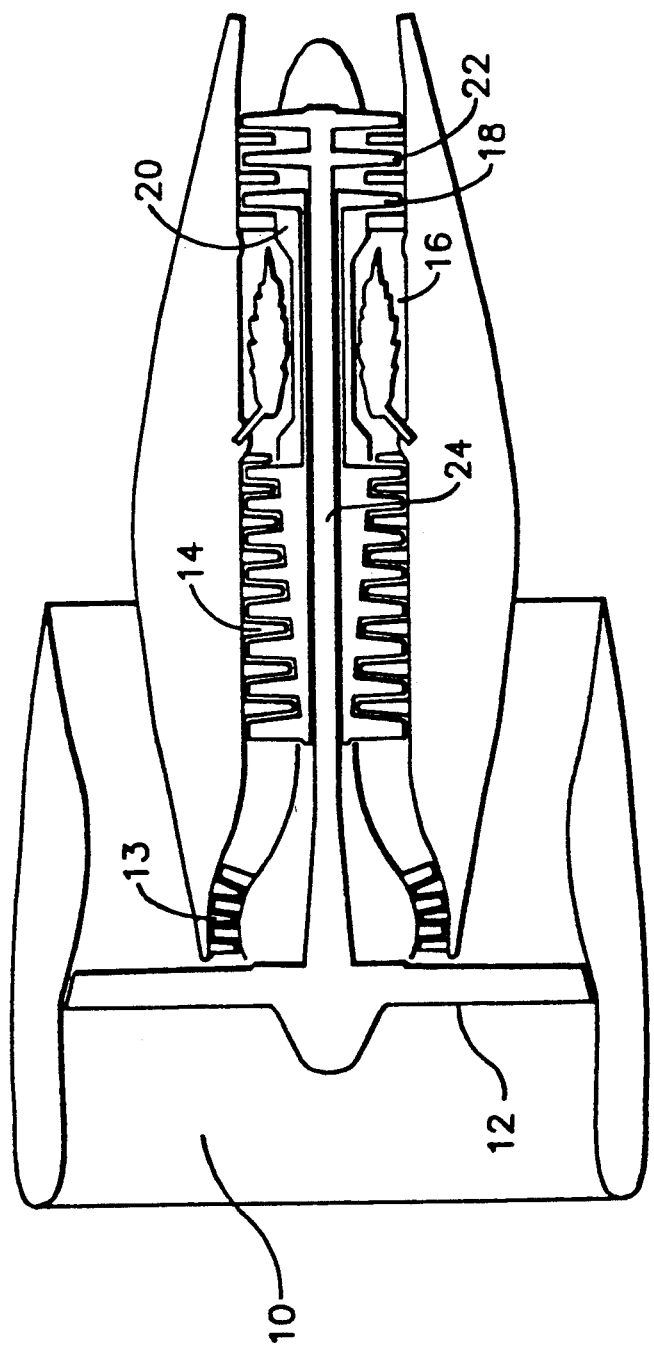
FIG. 1 illustrates the mechanical arrangement of a twin-spool turbofan engine.

Referring now to FIG. 1, shown in cross-section, taken along the engine axis, is the mechanical arrangement of a twin-spool engine. Air enters the engine through an inlet 10, located at the left of FIG. 1, then passes through a fan 12. A portion of the air passing through fan 12 is directed into a booster compressor 13 and thereafter into a high pressure compressor 14 which functions to supply supercharged air to combustion section 16. In the combustion section, fuel is mixed with the supercharged air received from compressor 14 and burned. The expanding gases produced pass on into a high pressure turbine 18, which is coupled to compressor 14 through a shaft or spool 20. The high pressure turbine uses some of the energy in the rapidly moving, hot gases coming out of combustion chamber 16 to turn spool 20 to drive compressor 14. A low pressure turbine 22, positioned behind high pressure turbine 18, extracts additional energy from the exhaust gas and turns a second shaft or spool 24, coaxial with spool 20, to drive fan 12 and booster compressor 13. The exhaust air exits the engine via exhaust nozzle 26.

Fan speed (called N1) and compressor or core engine speed (called N2) can be controlled by regulating the delivery of fuel to combustion section 16 or by altering the positioning of variable stator vanes (not shown) located between compressor rotors. In addition, it is possible to control the rotational speed of one spool by regulating fuel flow while modulating VSV angle to control the rotational speed of the second spool.

Figure 2:
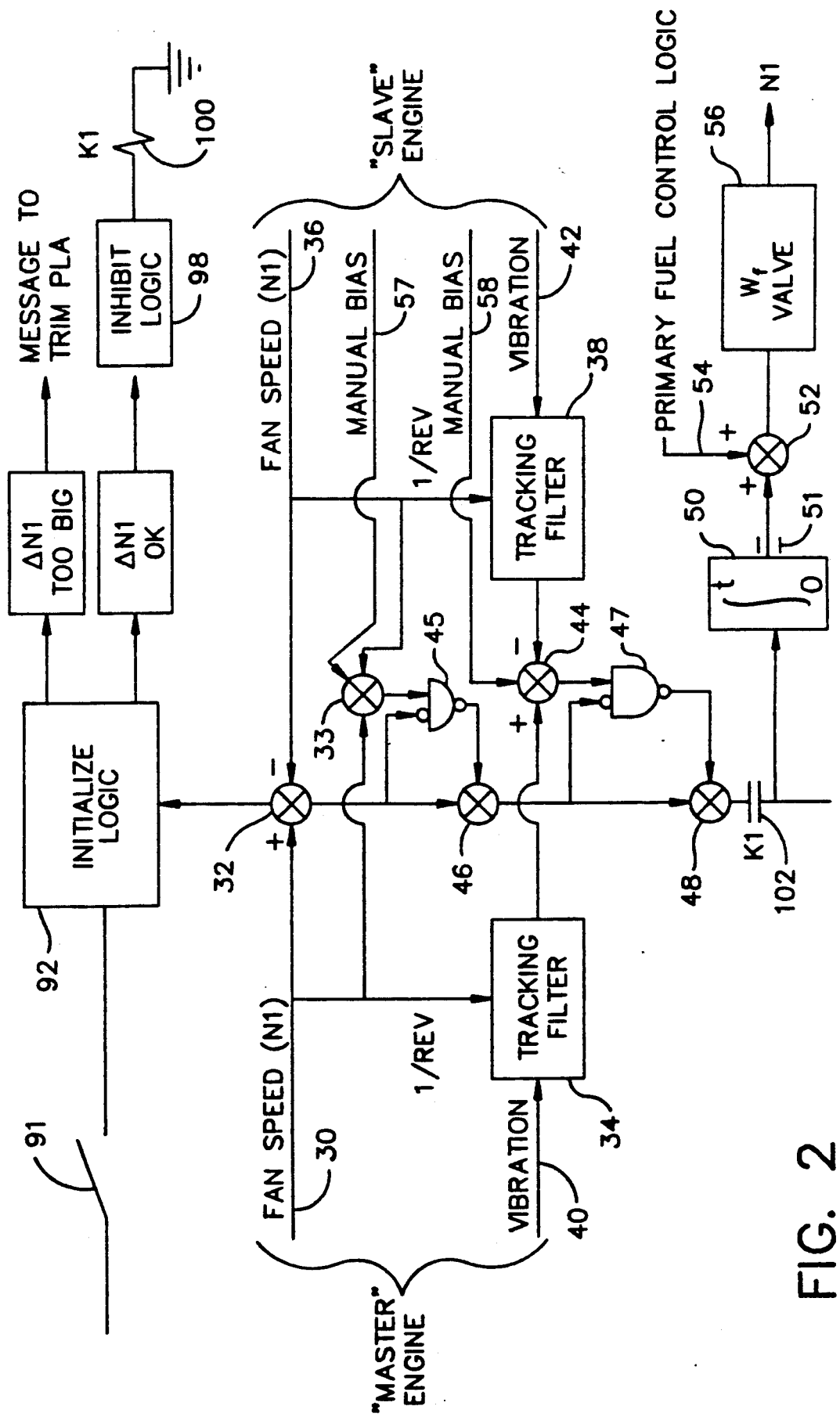
FIG. 2 is part of a block diagram illustration of an improved synchrophasing system, according to the present invention.
Figure 3:
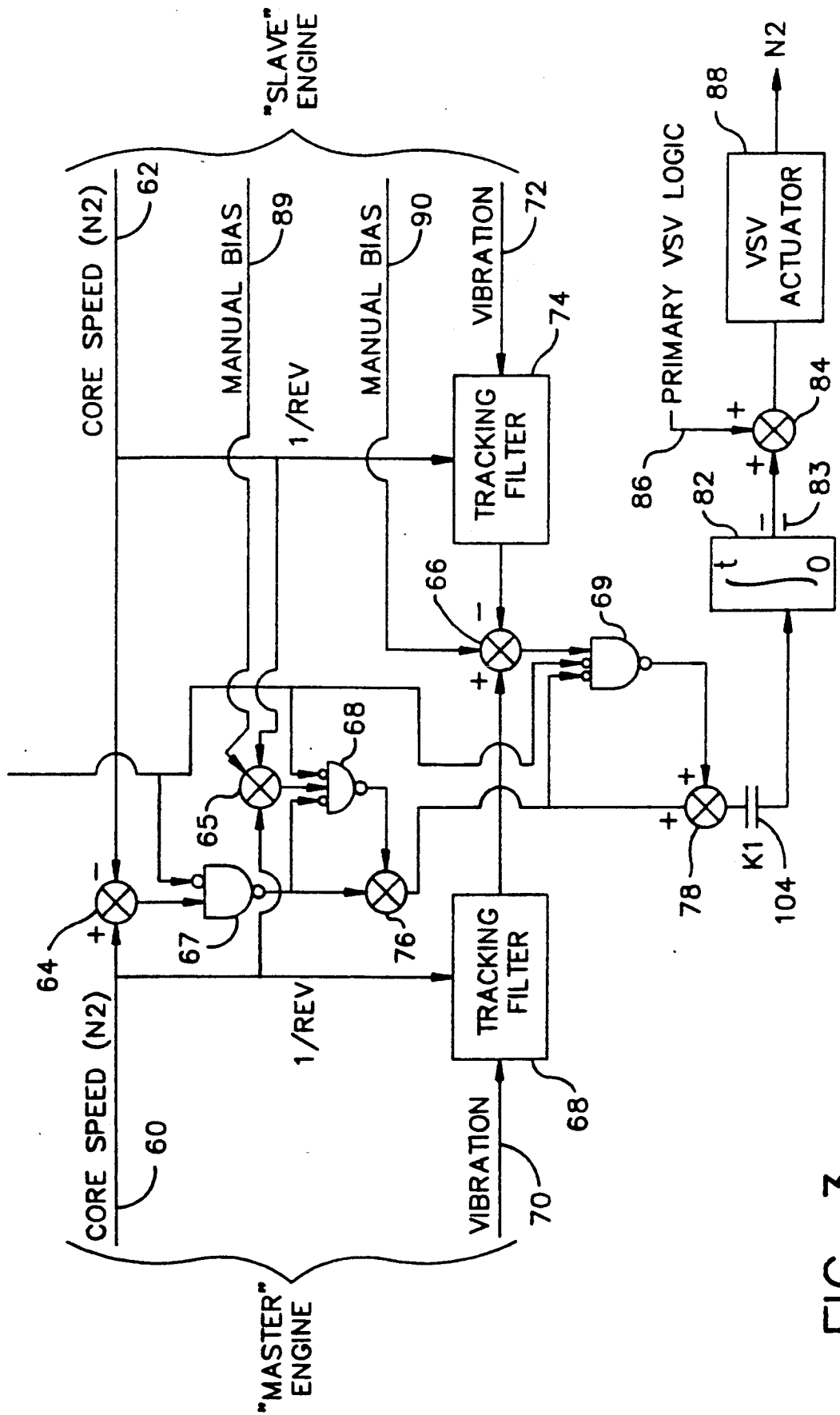
FIG. 3 is the remaining portion of the block diagram illustration of FIG. 2.

Shown in FIGS. 2 and 3 is a block diagram illustration of an improved synchrophasing system according to the present invention. The system compares fan speed, fan rotor vibration, core speed and core rotor vibration signals obtained from a "slave" engine to corresponding signals obtained from a "master" engine and modulates the flow of fuel and positioning of variable stator vanes (VSV) within the slave engine until the slave engine fan and core rotors achieve the same values as those of the master engine, with desired phasing of the vibration signals. The portion of the synchrophasing system shown in FIG. 2 monitors fan speed and fan rotor vibration and modulates the flow of fuel to the slave engine. Illustrated in FIG. 3 is the portion of the synchrophasing system which monitors core speed and core rotor vibration and modulates VSV angle within the slave engine.

Referring now to FIG. 2, the master engine fan speed signal, which includes a once-per-revolution pulse, is provided on a line 30 to a summing junction 32. The once-per-revolution pulse is also provided to a second summing junction 33 and a tracking filter 34. Similarly, the slave engine fan speed signal, which also includes a once-per-revolution pulse, is provided on a line 36 to summing junction 32 and the included once-per-revolution pulse is provided to summing junction 33 and a second tracking filter 38.

Summing junction 32 subtracts the slave engine fan speed signal from the master engine fan speed signal to generate a fan speed error signal. Summing junction 33 generates a signal indicative of the difference between the master and slave engine once-per-revolution signals. This error signal will be referred to as the fan 1/rev error signal.

In addition to receiving the once-per-revolution signal on line 30, tracking filter 34 is also provided with the fan rotor vibration signal from the master engine on line 40. Filter 34 averages the master fan vibration signal between the receipt of once-per-revolution pulses to generate a fan vibration per revolution signal for the master engine. Tracking filter 38, associated with the slave engine, receives the fan speed signal on line 36 and the slave engine fan rotor vibration signal on a line 42 and generates a fan vibration per revolution signal for the slave engine. Tracking filters 34 and 38 are electrically connected to provide their outputs to a third summing junction 44 which subtracts the signal received from filter 38 from the signal received from filter 34 and generates an error signal indicative of the difference in the fan vibration between the two engines. This signal will be referred to as the fan vib phase error signal.

Thus, three error signals associated with the fan rotor and identified as fan speed error, 1/rev error, and vib phase error, have been generated by summing junctions 32, 33 and 44, respectively. The 1/rev error signal generated by junction 33 is provided to an AND gate 45. Gate 45 also is connected to receive as an input, the inverted output from junction 32. The output of this gate and the fan speed error signal generated by junction 32 are aggregated by a fourth summing junction 46. AND gate 45 operates to lock out the transmission of the 1/rev signal to junction 46 unless the fan speed error signal small. Thus connected, junction 46 produces an output signal equal to the fan speed error signal when the fan speed error signal is large, and a signal equal to the sum of the fan speed error signal and 1/rev error signal when the fan speed error signal is small.

A second AND gate 47 is connected to receive as inputs, the vib phase error signal generated by summing junction 44 and the inverted output of junction 46. The output of AND gate 47 is added to the output of summing junction 46 by the operation of a fifth summing junction 48. AND gate 47 operates to permit passage of the vib phase error to junction 48 only when the output of junction 46 is small. An integrator 50, responsive to the signal generated by summing junction 48, provides a fuel flow biasing signal for altering the rate of fuel delivery to the slave engine and therefore core and fan rotor speeds within the slave engine.

The biasing signal generated by integrator 50 is added by a summing junction 52 to a fuel flow control signal received on line 54 from the slave engine's primary fuel control logic. The output of junction 52 operates a fuel flow valve 56 to control slave engine fan speed. Modulation of the fuel flow control signal by the synchrophasing system is restricted by a limiting means 51 provided between integrator 50 and summing junction 52. Limiting means 51 establishes a maximum value for the fuel flow biasing signal provided to junction 52.

Also shown in FIG. 2 are optional manual bias adjustments 57 and 58 which permit manual adjustment to the 1/rev error and vib phase error signals, respectively. The adjustment bias of the 1/rev error signal would allow a fixed phase offset between the rotors. This setting could represent the desired phase difference, and once set, would remain fixed until either engine was changed, or either fan rebalanced. The incorporation of this feature could eliminate the need for the vib phase error signal.

Positioning of variable stator vanes within the slave engine, for the purpose of altering core rotor speed, is biased by an arrangement of components similar to the circuitry described above and shown in FIG. 2.

Referring now to FIG. 3, the master engine core speed signal, which includes a once-per-revolution pulse, is provided on a line 60 to a summing junction 64. The once-per-revolution pulse is also provided to a summing junction 65 and a tracking filter 68. Likewise, the slave engine core speed signal, which includes a once-per-revolution pulse, is provided on a line 62 to summing junction 64 and the included once-per-revolution pulse is provided to summing junction 65 and a tracking filter 74.

Summing junction 64 generates a core speed error signal indicative of the difference in the master and slave engine core speed signals. Summing junction 65 generates a signal indicative of the difference between the master and slave engine once-per-revolution signals. This error signal will be referred to as the core 1/rev error signal.

Tracking filter 68 receives the core speed signal on line 60 and the master engine core rotor vibration signal on a line 70 and averages the master core vibration signal between receipt of once-per-revolution pulses to generate a core rotor vibration per revolution signal for the master engine. The slave engine core rotor vibration signal on a line 72 and the core speed signal on line 62 are provided to tracking filter 74 which generates a core rotor vibration per revolution signal for the slave engine. Filters 68 and 74 are electrically connected to provide their outputs to a summing junction 66 which generates an error signal indicative of the difference in the core rotor vibration between the two engines. This signal will be referred to as the core vib phase error signal.

AND gates 67, 68 and 69 and summing junctions 76 and 78 are electrically arranged to combine the three core rotor error signals generated by junctions 64, 65 and 66. The core speed error signal generated by summing junction 64 is provided to an AND gate 67. Gate 67 is also electrically connected to receive the inverted output of junction 48 shown in FIG. 2. The 1/rev error signal generated by summing junction 65 is provided to AND gate 68. Gate 68 is also electrically connected to receive the inverted output of gate 67 and the inverted output of junction 48. The outputs of AND gates 67 and 68 are aggregated by the operation of summing junction 76. The vib phase error signal generated by junction is provided to AND gate 69. Gate 68 is also electrically connected to receive the inverted output of junction 76 and the inverted output of junction 48. The outputs of AND gate 69 and junction 76 are combined by the operation of summing junction 78.

AND gates 67, 68 and 69 are used to inhibit the transmission of the core speed error signal, the core rotor 1/rev error signal, and the core rotor vib phase signal, respectively, until certain conditions are satisfied. The core speed error signal will not be provided to junction 76 unless the output of junction 48 is small. The core rotor 1/rev error signal will not pass through gate 68 to junction 76 unless the outputs of AND gate 67 and junction 48 are both small. Likewise, the core rotor vib phase error signal will not be transmitted to junction 78 unless the outputs of junctions 76 and 48 are both small.

An integrator 82, responsive to the aggregate signal generated by summing junction 78, generates a signal for biasing VSV positioning within the slave engine. The biasing signal generated by integrator 82 is added by a summing junction 84 to a VSV actuator control signal received on line 86 from the slave engine's primary variable stator vane control logic. The output of junction 84 operates a VSV actuator to control the positioning of variable stator vanes within the slave engine. Modulation of the VSV actuator control signal by the synchrophasing system is restricted by a limiting means 83 provided between integrator 82 and summing junction 84. Limiting means 83 establishes a maximum value for the VSV angle biasing signal provided to junction 84.

FIG. 3 also shows optional manual bias adjustments 89 and 90 which permit manual adjustment to the 1/rev error and vib phase error signals, respectively. The adjustment bias of the 1/rev error signal would allow a fixed phase offset between the rotors and the adjustment bias of the vib phase error signal would permit manual tuning of core rotor vibration.

Also shown in FIG. 2 is a synchrophase select switch 91 for activating the synchrophasing system. An initialization logic circuit, represented by block 92, receives the fan speed error signal ($\Delta N1$) from summing junction 32 and provides a message to the aircraft pilot to trim the pilot lever angle of the slave engine when the difference in fan speeds between the master and slave engines exceeds a predetermined value, such as 100 rpm. If $\Delta N1$ is small (below 100 rpm) an enable signal is provided to an inhibit logic circuit 98. Circuit 98 energizes a relay coil 100 to close contacts 102 and 104 to electrically connect the synchrophasing system with the slave engines primary fuel control and primary VSV actuator control systems.

Once engaged, the synchrophasing system operates to adjust the fan speed of the slave engine based on the fan speed error signal until the difference between the fan speeds of the master and slave engines is less than 1 rpm. Once the rpm's are within $\pm 1$ rpm, the fan rotor 1/rev error signal is used to further modulate the slave engine's fan speed until the rpm's are within $\pm 0.1$ rpm. AND gate 45 prohibits fan speed adjustment based on the fan rotor 1/rev error signal until $\Delta N1$ is less than 1 rpm. After the fan rotor speed of the slave engine has been adjusted to within $\pm 0.1$ rpm of the fan rotor speed of the master engine, the fan rotor vib phase error signal is utilized to minimize the vibrational differences between the fan rotors of the two engines. AND gate 45 prohibits fan speed adjustment based on the fan rotor vib phase error signal until $\Delta N1$ is less than 0.1 rpm.

AND gates 67, 68 and 69 prohibit biasing of the VSV actuator control signal until the fan rotors have been synchrophased. After synchrophasing of the fan rotors, the slave engine core speed is adjusted based on the core speed error signal ($\Delta N2$) until the difference in core speeds is less than 1 rpm. AND gate 68 then permits further adjustment using the core rotor 1/rev error signal until $\Delta N2$ is less than 0.1 rpm. After the core rotor speed of the slave engine has been adjusted to within $\pm 0.1$ rpm of the core rotor speed of the master engine, the core rotor vib phase error signal is utilized to minimize the vibrational differences between the core rotors of the two engines. AND gate 69 prohibits core speed adjustment based on the core rotor vib phase error signal until $\Delta N2$ is less than 0.1 rpm.

Initialization circuit 92 will disengage the synchrophasing system should the difference in fan speeds between the master and slave engines exceed a selected limit, such as 100 rpm. The system will re-engage should $\Delta N1$ thereafter drop below 100 rpm. To avoid loss of power from the slave engine should the master engine slow down for any reason, inhibit circuit 98 includes logic that disengages the synchrophasing system whenever the slave engine PLA versus N2 relationship exceeds a predetermined limit. The system will also be disengaged in the event of an engine shutdown, engine stall, or loss of either N1 signal.

The system can be designed to synchrophase the engine fan rotors, but not the core rotors, in the event of a loss of either N2 signal. Should there be a loss of either fan vibration signal or either core vibration signal, the system can be designed to continue to synchronize the fan rotors or core rotors based on N1 and N2 signals.

It will be clear to those skilled in the art that various modifications and changes of the system described above are possible without departing from the scope of the present invention. For example, vibration signals obtained from the aircraft airframe, cabin noise signals, or manual inputs could be used instead of engine vibration signals, or in addition to them, to synchrophase the engines.

In the embodiment of the invention described above, slave engine fan speed is modulated by adjusting fuel flow, while core speed is modulated by varying VSV angle. The roles of fuel flow biasing and VSV angle biasing can be reversed, however, so that fan speed is modulated by varying VSV angle and core speed is modulated by adjusting fuel flow. Alternatively, slave engine fan speed can be modulated by varying the fan inlet guide vane (IGV) angle rather than by modulating fuel flow. Slave engine core rpm can then be controlled by modulating fuel flow or by varying VSV angle. Accordingly, it is intended that the invention to be secured by Letters of Patent be limited only by the scope of the appended claims.

What is claimed is:

1. In an aircraft having a master turbofan engine and at least one slave turbofan engine, each of said engines having a fan rotor which rotates independently from a core rotor, a method for synchronizing the operation of said slave engine with said master engine, the steps comprising:

modulating the fuel flow rate to said slave engine to synchronize the operation of said fan rotors; and modulating the position of variable stator vanes within said slave engine to synchronize the operation of said core rotors;

wherein, said step of modulating the fuel flow to said slave engine includes the step of modulating the fuel flow rate in response to a fan rotor speed error signal indicative of the difference in the fan rotor rotational speeds of said master engine and said slave engine until the difference in the fan rotor rotational speeds is less than one revolution per minutes; and said step of modulating the position of variable stator vanes within said slave engine includes the step of modulating the position of variable stator vanes in response to a core rotor vibrational error signal indicative of the difference in the core rotor vibration of said master engine and said slave engine until a predetermined phase relationship between said core rotors is obtained.

2. The method of claim 1, wherein:

said step of modulating the position of variable stator vanes within said slave engine further includes the step of modulating the position of variable stator vanes in response to a core rotor speed error signal indicative of the difference in the core rotor rotational speeds of said master engine and said slave engine until the difference in the core rotor rotational speeds is less than one revolution per minute.

* * * * *